Figure 1:
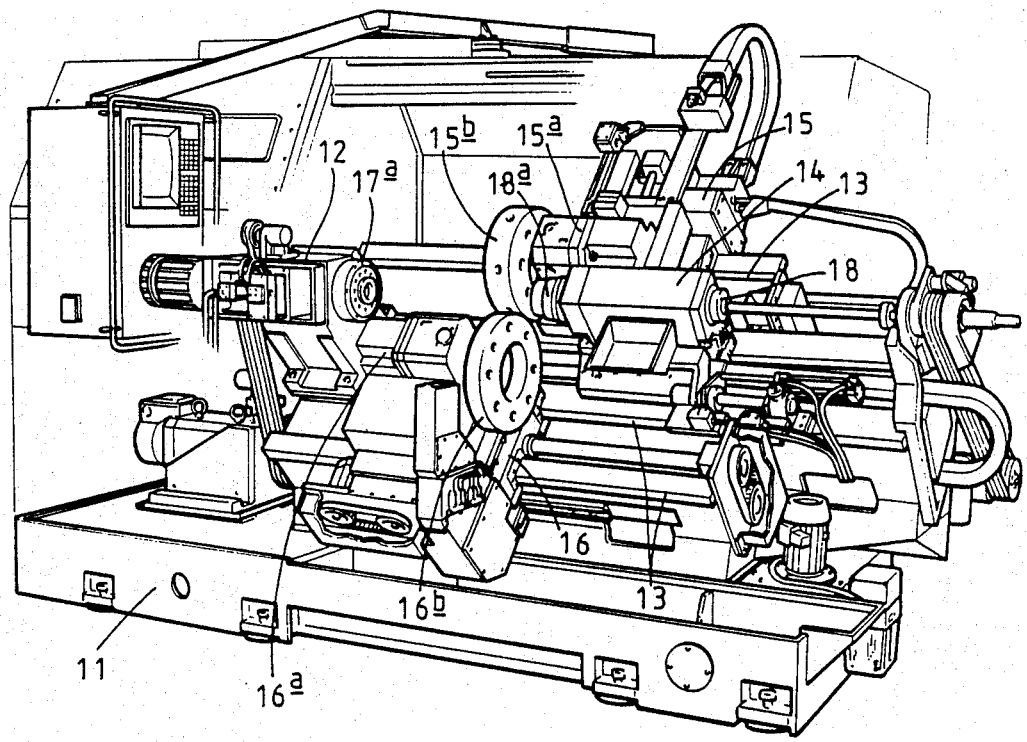

United States Patent [19]
Wilkins

[11] Patent Number: 4,827,814
[45] Date of Patent: May 9, 1989

[54] LATHES

[75] Inventor: Albert A. Wilkins, Coventry, England

[73] Assignee: Wickman Bennett Machine Tool Company Limited, Coventry, England

[21] Appl. No.: 130,567

[22] Filed: Dec. 9, 1987

[30] Foreign Application Priority Data

Dec. 20, 1986 [GB] United Kingdom ............... 8630495

[51] Int. Cl.$^4$ ............................................. B23B 3/00
[52] U.S. Cl. ..................................... 82/1.11; 82/159
[58] Field of Search ................... 82/1 C, 3, 2 B, 2.5, 82/36 A, 36 R; 74/422; 29/27 B, 27 A, 27 C, 39, 40

[56] References Cited

U.S. PATENT DOCUMENTS

| | | | |
|---|---|---|---|
| 3,750,244 | 8/1973 | Smith | 29/40 |
| 4,327,614 | 5/1982 | Klancnik et al. | 82/29 R |
| 4,457,193 | 7/1984 | Matthey | 82/36 A |
| 4,683,787 | 8/1987 | Link | 29/27 R |
| 4,719,676 | 1/1988 | Sansone | 29/27 A |

*Primary Examiner*—Frederick R. Schmidt
*Assistant Examiner*—Lawrence Cruz
*Attorney, Agent, or Firm*—Richard Bushnell; Trexler, Bushnell, Giangiorgi & Blackstone Ltd.

[57] ABSTRACT

A lathe comprising first and second headstocks having respective rotatable spindles carrying a respective workpiece gripping devices, the second headstock being presented towards the first headstock, and being relatively movable towards and away therefrom so that a workpiece gripped by the gripping device of the first headstock can be transferred to the gripping device of the second headstock. Movable tool carrier means associated with the first and second headstocks, whereby machining operations can be performed on workpieces held in the gripping devices of the first and second headstocks, and there is means for monitoring the angular positions of the spindles whereby rotational datum positions of the spindles can be established. A first drive and positioning means is provided for rotating the first spindle, and for positioning said first spindle angularly in predetermined relation to its rotational datum position, and, second drive and positioning means is provided for rotating said second spindle and for positioning said second spindle angularly in predetermined relation to its rotational datum position. The invention further resides in methods of transferring a workpiece between spindles in such a lathe.

4 Claims, 2 Drawing Sheets

LATHES

This invention relates to lathes.

It is known from U.S. Pat. No. 4,457,193 to provide a lathe with two workpiece holding chucks and the facility to transfer a workpiece from one of the chucks to the other, whereby certain turning operations can be performed on the workpiece when held by the first chuck, and other turning operations can be performed on the workpiece when held by the second chuck. U.S Pat. No. 4,457,193 discloses means for matching the rotational speeds of the two chucks at least during the transfer of the workpiece from one chuck to the other.

U.S. Pat. No. 3,750,244 discloses a lathe having a single chuck but with the facility for performing, at the operator's choice, normal turning operations with the workpiece rotating at high speed, milling operations with the workpiece stationary, or rotating at a speed much lower than that used for turning, the low speed rotation being matched to movement of the milling cutter so that complex shapes, for example cam forms, can be produced, and, cross-drilling operations performed with the workpiece stationary. It is convenient to refer to these latter operations, that is to say milling and cross-drilling operations and the like as "angular position related operations" in that contrary to conventional turning operations, these operations all include a function related to the angular position of the workpiece. Other operations which could fall within this heading are tapping and threading operations.

It is an object of the present invention to provide a lathe having first and second chucks between which a workpiece can be transferred, and wherein angular position related operations can be performed on the workpiece in either, or both chucks.

In accordance with a first aspect of the present invention there is provided a lathe comprising a first headstock having a first rotatable spindle carrying a workpiece gripping device, a second headstock having a second rotatable spindle carrying a respective workpiece gripping device, the second headstock being presented towards the first headstock, and being relatively movable towards and away from the first headstock so that a workpiece gripped by the gripping device of the first headstock can be transferred to the gripping device of the second headstock, movable tool carrier means associated with the first and second headstocks, whereby machining operations can be performed on workpieces held in the gripping devices of the first and second headstocks, means for monitoring the angular position of the first spindle whereby a rotational datum position of the first spindle can be established, means for monitoring the angular position of the second spindle whereby a rotational datum position of the second spindle can be established, first drive and positioning means for rotating the first spindle, and for positioning said first spindle angularly in predetermined relation to its rotational datum position, and, second drive and positioning means for rotating said second spindle and for positioning said second spindle angularly in predetermined relation to its rotational datum position.

Conveniently each of said drive and positioning means includes a drive mechanism for rotating the respective spindle and a positioning mechanism for accurately angularly positioning the spindle after rotation by the drive mechanism, under control of the respective monitoring means, to substantially the desired position.

Desirably each said positioning means comprises a pinion rotatable with the respective spindle and a rack engagable with the pinion to locate the respective spindle angularly.

Alternatively each said positioning means comprises a precision drive unit for rotating the respective spindle, each unit being able to locate its respective spindle angularly and to rotate its respective spindle slowly for milling operations.

Alternatively one of said first and second positioning means comprises a pinion rotatable with the respective spindle and a rack engagable with the pinion to locate the respective spindle angularly, and the other of said first and second positioning means comprises a precision drive unit for rotating the respective spindle, said unit being able to locate its respective spindle angularly and to rotate its respective spindle slowly for milling operations.

Preferably one of said first and second drive means includes a clutch for disengaging the respective prime mover from the respective shaft.

The invention further resides in a method of transferring a workpiece from the first headstock to the second headstock in a lathe of the kind specified above the method including the steps of angularly positioning the first spindle, and the workpiece carried thereby, at the datum position of the first spindle, engaging the workpiece gripping device of the second spindle with the workpiece while the workpiece is gripped also by the gripping device of the first spindle and establishing that angular position of the second spindle as the rotational datum position thereof, and, separating the workpiece from the first spindle.

The invention still further resides in a method of transferring a workpiece from the first headstock to the second headstock in a lathe of the kind specified above the method including the steps of angularly positioning the first spindle, and the workpiece carried thereby, at the datum position of the first spindle, angularly positioning the second spindle at its datum position, engaging the workpiece gripping device of the second spindle with the workpiece while the workpiece is gripped also by the gripping device of the first spindle, and, separating the workpiece from the first spindle.

It will be recognised that in accordance with the above methods, in effect the datum of the workpiece when carried by the first spindle is maintained when the workpiece is transferred to the second spindle. Thus angular position related operations performed on the workpiece carried by the first spindle will be related in position to said datum and therefore after transfer to the second spindle angular position related operations can be performed on the workpiece in positions related to the same datum. The effect is that those operations performed when the workpiece is carried by the second spindle can be as accurately angularly positioned on the workpiece in relation to operations performed while the workpiece is carried by the first spindle, as if all of the operations had been performed with the workpiece carried by the first spindle.

Preferably where the transfer involves parting the workpiece from stock carried by the first spindle, then the lathe includes a clutch in said second drive means which, when disengaged, permits free rotation of the second spindle.

Preferably in a method of transferring a workpiece which involves parting the workpiece from stock carried by the first spindle, then one of said first and second drive and positioning means includes a clutch and the method of transferring further includes the steps of disengaging said clutch after both spindle datums have been achieved and after the workpiece has been coupled to both spindles, energising the other said drive and positioning means so as to drive the first spindle, the workpiece, and the second spindle as a unit at a required speed, energising said one drive and positioning means at a speed to match the speed of the spindle of said other drive means, and reengaging said clutch so that upon separation of the workpiece from the first spindle both spindles continue to rotate at the same speed but under the control of their respective drive and positioning means.

Figure 2:
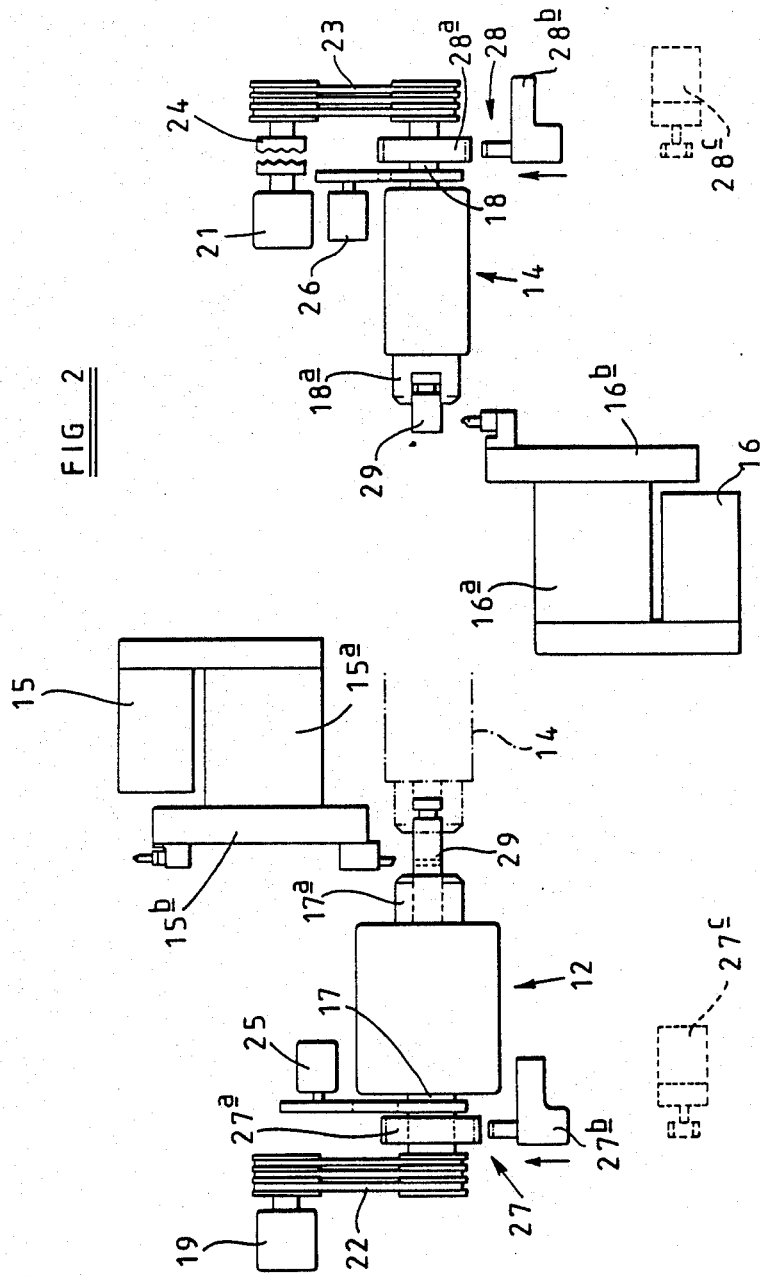

In the accompanying drawings,

FIG. 1 is a diagrammatic perspective representation of a lathe of the type in which the present invention can be embodied, and FIG. 2 is a diagrammatic illustration of a lathe of the kind shown in FIG. 1 in accordance with on example of the present invention.

Referring to the drawings, the lathe includes a bed 11 having a first, fixed headstock assembly 12 adjacent one end thereof. Extending longitudinally of the bed 11 parallel to the axis of the headstock assembly 12 are a plurality of slideways 13, one of which slidably supports a second headstock assembly 14 aligned with the headstock assembly 12 and others of which slidably support first and second turret supporting carriages 15, 16. The headstock assembly 12 includes a rotatable spindle 17 carrying a chuck 17a for rotating therewith. The second headstock assembly 14 also includes a rotatable spindle 18 similarly provided with a chuck 18a. The spindles 17, 18 are axially aligned, and the chuck 18a is presented towards the chuck 17a. The facility for movement of the headstock 14 on the appropriate slideway 13 provides for the chuck 18a to approach the chuck 17a, so that, as will be described in more detail hereinafter, a workpiece 29 can be transferred from the chuck 17a to the chuck 18a. Each of the carriages 15, 16 may be of well known form including slideways extending transverse to the sideways 13, and upon which turret carriers 15a, 16a are slidably mounted. Each of the turret carriers may carry a rotatable turret 15b, 16b for carrying a plurality of cutting tools. Each turret is rotatable relative to its carrier about an axis parallel to the axis of the spindles 17, 18 and it is intended that the tools carried by the carriage 15 shall operate on a workpiece gripped by the chuck 17a, and the tools of the carriage 16 shall operate on a workpiece gripped by the chuck 18a. In addition to carrying "fixed" cutting tools the turrets may also carry "driven" tools such as drills for crossdrilling the workpiece, milling cutters, and taps and dies for internal and external thread cutting.

It will be recognised that rotation of a turret is used to bring alternative tools into operation, and the positioning of the tools in relation to the workpiece is controlled by movement of the carriages along the longitudinally extending slideways 13, and movement of the appropriate turret carrier on its respective carriage in a direction transverse to the slideways 13. The lathe will of course incorporate drive means for moving the carriages, the turret carriers, and the turrets in addition to means for moving the headstock 14, and there will be the facility for control of all of these movements from a numerical control unit of the lathe.

The spindles 17, 18 can carry chucks or collects for gripping the workpiece and a convenient arrangement is to provide the spindle 17 with a bar stock feed arrangement which can supply bar stock through the hollow spindle to be gripped by an automatically operable collet carried by the spindle 17. Such an arrangement will be described in more detail below.

Each of the spindles 17, 18 is separately driven from its own speed controllable electric motor 19, 21 through a respective belt drive 22, 23. In the drive connection of the spindle 18, between the motor 21 and the belt drive 23, there is provided an electromagnetically operable clutch 24, it being recognised that when the clutch 24 is de-energised then the spindle 18 is freely rotatable relative to the motor 21.

Associated with each of the spindles 17, 18 is a respective rotary encoder 25, 26, the encoders being capable of producing an electrical output whereby the angular position of their respective spindle can be monitored. Although the motors 19, 21 and associated gearboxes are capable of operation at quite low speeds and are capable of positioning their respective spindle angularly to an accuracy of about one degree, they are not usually sufficiently accurately controllable to achieve a predetermined angular position of their respective spindle with the accuracy which would be necessary for example to enable cross-drilling to take place. In order to position accurately each spindle, for example, when cross drilling of a workpiece is required, there is associated with each spindle 17, 18 a positioning device 27, 28 generally in the form of a rack and pinion mechanism, the pinion of which (indicated in FIG. 2 by the suffix a) is carried by the respective spindle, and the rack (indicated in FIG. 2 by the suffix b) of which is movable transverse to the respective spindle into and out of meshing engagement with the respective pinion under the control of the control mechanism of the lathe. Thus when cross drilling or similar angular position related operations are required either spindle can be orientated accurately in a number of angular positions equal to or based on the number of teeth on the respective pinion 27b, 28b. It will be understood that although the racks 27a, 27b do not move longitudinally they will, if necessary, generate a small amount of angular movement of their respective pinion as the rack teeth mesh with the pinion teeth. Thus the respective motor 19, 21 will achieve a positioning of its respective spindle 17, 18 which has an accuracy greater than the pitch of the pinion teeth, and engagement of the respective rack will then position the spindle accurately and lock the spindle against further movement. If special angular divisions are required then appropriate special pinions and racks can be provided.

The operation of the lathe is as follows. Let us assume that a workpiece 29 is present in the chuck 17a of the headstock 12, but as yet no workpiece is present in the chuck 18a of the head stock 14. The first sequence of operations to be performed on the workpiece 29 present in the chuck 17a is a series of high speed turning operations using "fixed" tools carried by the turret 15b. The rack 27b is disengaged from the pinion 27a, and the motor 19 is operated at the predetermined chosen speed for turning operations, and the turret 15b is manipulated as necessary to effect the predetermined sequence of turning operations.- The next operation in the sequence is an angular position related operation, for example, cross-drilling of several angularly related holes and in order to effect this operation the motor 19 is de-energised to bring the spindle 17 to a halt at a predetermined angular position. The rack 27b is then engaged with the pinion 27a thus accurately positioning the spindle and locking the spindle against rotation. This angular position of the spindle is now established as a datum position, and a cross-drilling tool on the turret 15b is brought into the appropriate location to cross-drill the workpiece 29. To perform further cross-drilling operations at different angular locations, the rack 27b is withdrawn and motor 19 is driven under the control of encoder 25 to drive the spindle through the appropriate angular distance relative to the datum position, thus rotating the workpiece, whereafter the rack is re-engaged with the pinion accurately to locate and lock the spindle in the new position. Thereafter the next cross-drilling operation is performed.

It will be recognised that the foregoing description assumes that the first cross-drilling operation does not need to be performed in any particular angular position related to pre-existing features of the workpiece. However, in the event that the workpiece has pre-existing features to which the first cross-drilling must be angularly related, then of course it is necessary to establish the datum position of the spindle 17 in relation to the pre-existing features of the workpiece when the workpiece is first introduced into the chuck 17a. Thereafter, when it is time to perform the first cross-drilling operation, the motor 19 under the control of the encoder 25 will rotate the spindle to its datum position, and to the necessary angular location in relation to the datum position at which the first cross-drilling is to be performed.

When milling operations, for example using a milling cutting head carried by the turret 15b, are to be performed, either instead of or additional to cross-drilling operations, then instead of a rack 27b the lathe will incorporate a slow speed precision drive motor and gear box unit the output shaft of which drives the spindle 17 through the pinion 27a. Such a motor and gearbox unit, often known as a "C-axis" drive, is capable of rotating and angularly positioning the spindle much more accurately than the main drive motor 19. Thus the precision drive unit, under control of the encoder 25, will during the milling operation, rotate the workpiece through a predetermined angular distance at predetermined speed while the milling head is also being moved relative to the workpiece in order to produce a predetermined form, for example a cam form, on the workpiece. The spindle 18 can be similarly equipped with a precision drive motor and gearbox unit in place of the rack 28b if milling operations are to be performed on the workpiece when carried by the spindle 18. Thus the lathe may have a precision drive unit associated with either or both spindles 17 and 18 dependent upon where milling operations are to take place. The precision drive motor and gearbox unit can provide sufficiently accurate angular positioning and locking of a spindle to permit cross drilling and other angular position related operations and so it will not be necessary to provide a spindle with both a rack and a precision drive unit.

In FIG. 2 the possibility of using a precision drive unit in place of a rack is indicated by the showing of such units at 27c and 28c in broken lines.

Let us assume that the next sequence of operations is to include further angular position related operations but performed while the workpiece is gripped in the chuck 18a of the headstock 14, these operations being related angularly to those performed while the workpiece is carried by the spindle 17. The control mechanism of the lathe now returns the spindle 17, and thus the workpiece 29 to the angular datum position as determined by the encoder 25 whereupon the rack is operated to engage the pinion 27a, or the precision drive unit is operated, so positioning accurately and locking the spindle 17. The control mechanism of the lathe now advances the headstock 14 along the bed of the lathe towards the headstock 12 so that chuck 18a of the headstock 14 is engaged with the free end of the workpiece 29, and grips the workpiece whilst the workpiece is still gripped by the collet 17a. The encoder 26 of the headstock 14, being engaged with the spindle 18, establishes the current position of the spindle 18 as its angular datum position as the chuck 18a grips the workpiece and thus since the spindle 17 is also in its datum position then the spindle 17 and the spindle 18 have identical angular datum positions at this stage. Naturally if the spindle 18 has a predetermined datum position it may be desirable to maintain this datum and in this case the spindle 18 will be rotated to its datum position and locked therein by means of the rack 28b, or the respective precision drive unit, before the chuck 18a grips the workpiece.

The clutch 24 is now disengaged to permit the spindle 18 to rotate freely, and the racks 27b, 28b or precision drive units are disengaged from their respective pinions. The motor 19 is now energised to drive the spindle 17, and since the workpiece 29 is linking the spindle 17 with the spindle 18 the motor 19 also drives the spindle 18. When the motor 19 has reached a predetermined speed the control mechanism of the lathe energises the motor 21 to run at a corresponding speed, and causes the clutch 24 to be engaged. At this point in time therefore, the spindle 17 is driven by the motor 19, and the spindle 18 is driven by the motor 21, both spindles being driven at the same speed. A parting tool on the turret 15b is now indexed to the appropriate position to sever the workpiece 29 adjacent the chuck 17a and thereafter of course the parted workpiece is driven solely by the motor 21.

In theory it is not necessary to disengage the clutch 24 and to use only the motor 19 to run both spindles up to speed prior to parting the workpiece 29. In theory the clutch could be engaged and both motors 19, 21 could be energised simultaneously. In practice, although the motors 19, 21 are as nearly identical as possible there will be differences, and thus during acceleration of the motors from rest up to the parting off speed it is probable that the two motors would apply different torques to their respective spindles with the attendant risk of slippage of the workpiece relative to one or other of the chucks. Moreover motor 19 might accelerate at a higher rate than motor 21 and thus induce an electrical generating effect in motor 21.

Clearly if the workpiece slips relative to the chuck 18 then the datum position of the workpiece relative to the spindle 18 will have been lost. Thus, in practice the clutch 24 is disengaged and the motor 19 is used to run both spindles up to speed. There is unlikely to be any significant difference in the controlled speeds of the two motors 19, 21 and thus once the two spindles are at speed, driven by the motor 19, it is acceptable, after the motor 21 has reached the appropriate speed, to engage the clutch 24.

Following parting of the workpiece 29 it will be recognised that the workpiece 29 is held in the chuck 18a with its spindle datum related to the angular datum of the spindle 18 and thus subsequently angularly position related operations can be performed on the workpiece 29 while it is held in the chuck 18a with those operations being accurately angularly related to the result of the angular position related operations performed when the workpiece was held by the collet of spindle 17. For example, if it is necessary to perform a cross-drilling operation in a part of the workpiece 29 which was originally obscured by the collet, and for this cross-drilling operation to be angularly related to an earlier cross-drilling operation performed while the workpiece was held in the collet, then this subsequent cross-drilling operation using a tool held in the turret 16b can be easily achieved since the datum relationship has been maintained throughout the transfer of the workpiece from the collet to the chuck 18a. It will be recognised therefore, that positioning angularly of the spindle 18 for angular position related operations is similar to that described above in relation to the spindle 17, the motor 21, under control of the encoder 26, moving the spindle to the approximate position and the rack 28b engaging the pinion 28a to achieve final positioning and locking of the spindle 18.

FIG. 2 shows, in chain dotted lines, the position of part of the headstock 14 and chuck 18a when gripping a workpiece 29 which is still held by the chuck 17a.

It will be recognised from the foregoing description, that it is possible to perform angular position related operations on the workpiece irrespective of which of the chucks supports the workpiece, and more importantly, irrespective of a transfer of the workpiece from one chuck to the other.

It will be understood that if desired the clutch 24 could be providing in the drive to the spindle 17 rather than that to the spindle 18. It is however usual to provide spindle 17 with a more powerful drive arrangement than that of spindle 18 and so a more heavy duty clutch would be needed.

In the event that a bar stock feed is not used and cut workpieces are manually loaded as necessary into a chuck replacing the collet 17a, then no parting-off operation is needed when transferring the workpiece to chuck 18a. Thus in such circumstances no clutch is needed in the drive to spindle 18 and the transfer makes use of only those steps necessary to ensure transfer of the datum from spindle 17 to spindle 18 so that angular position related operations can be performed when the workpiece is carried by the spindle, 18, such operations being angularly related to those performed when the workpiece was carried by the spindle 17. However it will be recognised that a clutch may be utilized in certain chucking operations and thus its provision is beneficial even though it may not be needed in the circumstances set out above.

It will be recognised that if sufficiently accurate drive motors 19, 21 and associated gearboxes were available it would be possible to dispense with the rack and pinion positioning means and/or slow speed precision drive units since accurate positioning of the spindles and perhaps also locking of the spindles could be achieved by the motors. However, in the absence of such motors the final positioning and locking of the spindles is achieved by means such as the rack and pinion mechanisms or precision drive motor and gearbox units.

I claim:

1. A method of transferring a workpiece from the first headstock to the second headstock in a lathe comprising a first headstock having a first rotatable spindle carrying a respective workpiece gripping device, a second headstock having a second rotatable spindle carrying a respective workpiece gripping device, the second headstock being presented towards the first headstock, and being relatively movable towards and away from the first headstock so that a workpiece gripped by the gripping device of the first headstock can be transferred to the gripping device of the second headstock, movable tool carrier means associated with the first and second headstocks, whereby machining operations can be performed on a workpiece held in the gripping devices of the first and second headstocks, means for monitoring the angular position of the first spindle whereby a rotational datum position of the first spindle can be established, means for monitoring the angular position of the second spindle and for establishing a rotational datum position of the second spindle in known relationship to said datum position of said first spindle, first drive and positioning means for rotating the first spindle, and for positioning said first spindle angularly in predetermined relation to its rotational datum position, and, second drive and positioning means for rotating said second spindle and for positioning said second spindle angularly in a predetermined relation to its rotational datum position; and a clutch in one of said first and second drive and positioning means;

the method including the steps of: angularly positioning the first spindle, and a workpiece carried thereby, at the datum position of the first spindle; engaging the workpiece gripping device of the second spindle with said workpiece while said workpiece is gripped also by the gripping device of the first spindle and establishing that angular position of the second spindle as the rotational datum position thereof; disengaging said clutch after both spindle datums have been achieved and after the workpiece has been coupled to both spindles, energizing the other said drive and positioning means so as to drive the first spindle, the workpiece, and the second spindle as a unit at a required speed, energizing said one drive and positioning means at a speed to match the speed of the spindle of said other drive means; reengaging said clutch; and separating the workpiece from the first spindle so that both spindles continue to rotate at the same speed but under the control of their respective drive and positioning means.

2. A method as claimed in claim 1 wherein said clutch is included in said second drive and positioning means.

3. A method of transferring a workpiece from the first headstock to the second headstock in a lathe comprising a first headstock having a first rotatable spindle carrying a respective workpiece gripping device, a second headstock having a second rotatable spindle carrying a respective workpiece gripping device, the second headstock being presented towards the first headstock, and being relatively movable towards and away from the first headstock can be transferred to the gripping device of the second headstock, movable tool carrier means associated with the first and second headstocks, whereby machining operations can be performed on a workpiece held in the gripping devices of the first and second headstocks, means for monitoring the angular position of the first spindle whereby a rotational datum position of the first spindle can be established, means for monitoring the angular position of the second spindle and for establishing a rotational datum position of the second spindle in known relationship to said datum position of said first spindle, first drive and positioning means for rotating the first spindle, and for positioning said first spindle angularly in predetermined relation to its rotational datum position, and, second drive and positioning means for rotating said second spindle and for positioning said second spindle angularly in predetermined relation to its rotational datum position, and a clutch in one of said first and second drive and positioning means; the method including the steps of angularly positioning the first spindle, and a workpiece carried thereby, at the datum position of the first spindle, angularly positioning the second spindle at its datum position, engaging the workpiece gripping device of the second spindle with said workpiece while said workpiece is gripped also by the gripping device of the first spindle; disengaging said clutch after both spindle datums have been achieved and after the workpiece has been coupled to both spindles, energizing the other said drive and positioning means so as to drive the first spindle, the workpiece, and the second spindle as a unit at a required speed, energizing said one drive and positioning means at a speed to match the speed of the spindle of said other drive means; reengaging said clutch; and separating the workpiece from the first spindle so that both spindles continue to rotate at the same speed but under the control of their respective drive and positioning means.

4. A method as claimed in claim 3 wherein said clutch is included in said second drive and positioning means.

* * * * *